US006323630B1

(12) United States Patent
Banba

(10) Patent No.: US 6,323,630 B1
(45) Date of Patent: *Nov. 27, 2001

(54) REFERENCE VOLTAGE GENERATION CIRCUIT AND REFERENCE CURRENT GENERATION CIRCUIT

(76) Inventor: Hironori Banba, c/o Intellectual Property Division, Kabusiki Kaisha Toshiba, 1-1 Shibaura 1-chome, Minato-ku, Tokyo 105-8001 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/604,816

(22) Filed: Jun. 28, 2000

Related U.S. Application Data

(63) Continuation of application No. 09/122,641, filed on Jul. 27, 1998.

(30) Foreign Application Priority Data

Jul. 29, 1997 (JP) .................................................. 9-203201

(51) Int. Cl.[7] ............................... G05F 3/16; H02M 7/00

(52) U.S. Cl. ............................................. 323/313; 363/73

(58) Field of Search .................................... 323/312, 313, 323/314; 363/73

(56) References Cited

U.S. PATENT DOCUMENTS

| | | | |
|---|---|---|---|
| 3,947,704 | 3/1976 | Baluschild | 330/297 |
| 3,986,097 | 10/1976 | Woods | 363/22 |
| 3,992,660 | 11/1976 | Kawashime et al. | 363/8 |
| 4,292,633 | 9/1981 | Goodwin, Jr. et al. | 340/870.39 |
| 4,620,140 | 10/1986 | Chonan | 318/332 |
| 4,713,600 | 12/1987 | Tsugaru et al. | 323/351 |
| 4,797,583 | 1/1989 | Veno et al. | 307/475 |
| 5,103,159 | 4/1992 | Breugnot et al. | 323/315 |
| 5,399,900 | 3/1995 | Miyake | 330/254 |
| 5,508,604 | 4/1996 | Keeth | 323/314 |
| 5,515,260 | 5/1996 | Watanabe et al. | 363/73 |
| 5,760,614 | 6/1998 | Ooishi et al. | 327/77 |
| 6,160,391 | * 12/2000 | Banba | 323/313 |

FOREIGN PATENT DOCUMENTS

| | | |
|---|---|---|
| 725 328 A1 | 8/1996 | (EP) . |
| 63-253421 | 10/1988 | (JP) . |
| 5-241672 | 9/1993 | (JP) . |
| 5-250055 | 9/1993 | (JP) . |

OTHER PUBLICATIONS

Korean Office Action for Korean Patent Application No. 10–1998–0030560 dtd Feb. 28, 2001.

* cited by examiner

*Primary Examiner*—Adolf Deneke Berhane

(57) ABSTRACT

A reference voltage generation circuit includes a first current conversion circuit for converting a forward voltage of a p-n junction into a first current proportional to the forward voltage, a second current conversion circuit for converting a voltage difference between forward voltages of p-n junctions differing in current density into a second current proportional to the voltage difference, a current add circuit for adding the first current from the first current conversion circuit to the second current from the second current conversion circuit, and a current-to-voltage conversion circuit for converting a third current into a voltage. MIS transistors are used as active elements other than the p-n junctions. This enables the less temperature-dependent, less power-supply-voltage-dependent output voltage of the reference voltage generation circuit to be set at a given value in the range of the power supply voltage, which enables semiconductor devices to operate on 1.25V or lower.

12 Claims, 11 Drawing Sheets

REFERENCE VOLTAGE GENERATION CIRCUIT AND REFERENCE CURRENT GENERATION CIRCUIT

This application is a continuation of prior application Ser. No. 09/122,641, filed Jul. 27, 1998.

BACKGROUND OF THE INVENTION

The present invention relates to a reference voltage generation circuit and reference current generation circuit in a semiconductor device, and more particularly to a reference voltage generation circuit and reference current generation circuit constituted by MOS transistors in a semiconductor device using, for example, a reference voltage lower than the power supply voltage.

A band gap reference (BGR) circuit has been known as a less temperature-dependent, less power-supply-voltage-dependent reference voltage generation circuit. The name of the circuit has come from generating a reference voltage almost equal to the silicon's bandgap value of 1.205V. The circuit is often used to obtain highly-accurate reference voltages.

With a BGR circuit constituted by conventional bipolar transistors in a semiconductor device, the forward voltage (with a negative temperature coefficient) at a p-n junction diode or the p-n junction (hereinafter, referred to as the diode) between the base and emitter of a transistor whose collector and base are connected to each other is added to a voltage several times as high as the voltage difference (having a positive temperature coefficient) of the forward voltages of the diodes differing in current density in order to output a voltage of about 1.25V with a temperature coefficient of nearly zero.

At present, the voltage on which semiconductor devices operate is getting lower. When the output voltage of a BGR circuit was about 1.25V, the lower limit of the power supply voltage was 1.25V+α. Consequently, however small α may be made, the semiconductor device could not be operated on the power supply voltage of 1.25V or lower.

The reason for this will be explained in detail.

FIG. 1 shows the basic configuration of a first conventional BGR circuit constituted by n-p-n transistors.

In FIG. 1, $Q_1$, $Q_2$, and $Q_3$ indicate n-p-n transistors, $R_1$, $R_2$, and $R_3$ resistance elements, and I a current source. Furthermore, $V_{BE1}$, $V_{BE2}$, and $V_{BE3}$ represent the base-emitter voltages of the transistors $Q_1$, $Q_2$, and $Q_3$ respectively, and $V_{ref}$ the output voltage (reference voltage).

When the transistors $Q_1$, $Q_2$ have the same characteristics, the emitter voltage $V_2$ of the transistor $Q_2$ is:

$$V_2=V_{BE1}-V_{BE2}=V_T\cdot\ln(I_1/I_2) \quad (1)$$

This gives:

$$V_{ref}=V_{BE3}+(R_3/R_2)V_2$$
$$=V_{BE3}+(R_3/R_2)V_T\cdot\ln(I_1/I_2) \quad (2)$$

The first term in equation (2) has a temperature coefficient of about −2 mV/° C. In the second term in equation (2), the thermal voltage $V_T$ is:

$$V_T=k\cdot T/q \quad (3)$$

Thus, the temperature coefficient is expressed as:

$$(R_3/R_2)(k/q)\ln(I_1/I_2) \quad (4)$$

To find the condition for making the temperature coefficient of $V_{ref}$ zero, substituting $$k=1.38\times10^{-23}\ \mathrm{J/K} \quad (5)$$

$$q=1.6\times10^{-19}\ \mathrm{C} \quad (6)$$

This gives:

$$(R_3/R_2)\ln(I_1/I_2)=23.2 \quad (7)$$

In equation (2), if $V_{BE3}$=0.65V at 23° C., $$\text{then } V_{ref}=0.65+0.6=1.25\mathrm{V} \quad (8)$$

This value is almost equal to the bandgap value (1.205) of silicon.

The BGR circuit of FIG. 1 has disadvantages in that its output voltage is fixed at 1.25V and its power supply voltage cannot be made lower than 1.25V.

FIG. 2 shows the basic configuration of a second conventional BGR circuit using no bipolar transistor.

The BGR circuit is constituted by a diode $D_1$, an N number of diodes $D_2$, resistance elements $R_1$, $R_2$, $R_3$, a differential amplifier circuit $DA_1$ constituted by CMOS transistors, and a PMOS transistor $T_p$.

The voltage $V_A$ at one end of the diode $D_1$ is supplied to the—side input of the differential amplifier circuit $DA_1$ and the voltage $V_B$ at one end of the diode $D_2$ is supplied to the +side input of the circuit $DA_1$, so that feedback control is performed such that $V_A$ is equal to $V_B$ (the voltages at both ends of $R_1$ is equal to those of $R_2$).

$$\text{Thus, } I_1/I_2=R_2/R_1 \quad (9)$$

The characteristics of the diode are expressed by the following equations:

$$I=Is\{e^{(q\cdot V_F/k\cdot T)}-1\} \quad (10)$$

$$V_F>>q/k\cdot T=26\ \mathrm{mV} \quad (11)$$

where Is is the (reverse) saturation current and $V_F$ is the forward voltage.

From equation (11), −1 in equation (10) can be ignored. This gives:

$$V_F=V_T\cdot\ln(I/Is) \quad (12)$$

The voltage across the resistance element $R_3$ is:

$$dV_F=V_{F1}-V_{F2}=V_T\cdot\ln(N\cdot I_1/I_2)$$
$$=V_T\cdot\ln(N\cdot R_2/R_1) \quad (13)$$

The thermal voltage $V_T$ has a positive temperature coefficient k/q=0.086 mV/° C. and the forward voltage $V_{F1}$ of the diode $D_1$ has a negative temperature coefficient of about −2 mV/° C.

Then, under the following conditions:

$$V_{ref}=V_{F1}+(R_2/R_3)dV_F \quad (14)$$

$$\partial V_{ref}/\partial T=0 \quad (15)$$

the resistance values of the resistance elements $R_1$, $R_2$, and $R_3$ are set.

As an example, if N=10, $R_1$=$R_2$=600 kΩ, and $R_3$=60 kΩ, $dV_F$ will be the voltage difference between diode $D_1$ and diode $D_2$ whose current ratio is 1:10. This will give:

$$V_{ref}=V_{F1}+10\cdot dV_F=1.25\mathrm{V} \quad (16)$$

Like the first conventional circuit, the second conventional circuit has disadvantages in that its output voltage is fixed at 1.25V (or invariable) and the power supply voltage used cannot be made lower than 1.25V.

As described above, conventional BGR circuits that generate a less temperature-dependent, less power-supply-voltage-dependent reference voltage have disadvantages in that their output voltage is fixed at about 1.25V and they cannot be operated on a power supply voltage lower than about 1.25V.

BRIEF SUMMARY OF THE INVENTION

Accordingly, it is an object of the present invention is to provide a reference voltage generation circuit capable of generating a less temperature-dependent, less power-supply-voltage-dependent reference voltage at a given low voltage in the range of a supplied power-supply voltage and further operating on a voltage lower than 1.25V.

It is anther object of the present invention to provide a reference current generation circuit capable of generating a less temperature-dependent, less power-supply-voltage-dependent reference current.

According to one aspect of the present invention, there is provided a reference voltage generation circuit comprising a first current conversion circuit for converting a forward voltage of a p-n junction into a first current proportional to the forward voltage; a second current conversion circuit for converting a voltage difference between forward voltages of p-n junctions differing in current density into a second current proportional to the voltage difference; and a current-to-voltage conversion circuit for converting a third current obtained by adding the first current from the first current conversion circuit to the second current from the second current conversion circuit into a voltage, wherein MIS transistors are used as active elements other than the p-n junctions.

According to another aspect of the present invention, there is provided a reference current generation circuit comprising a first current conversion circuit for converting a forward voltage of a p-n junction into a first current proportional to the forward voltage; a second current conversion circuit for converting the voltage difference between forward voltages of p-n junctions differing in current density into a second current proportional to the voltage difference; and a current add circuit for adding the first current from the first current conversion circuit to the second current from the second current conversion circuit, wherein MIS transistors are used as active elements other than the p-n junctions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Hereinafter, referring to the accompanying drawings, implementations having embodiments of the present invention will be explained in detail.

Figure 3:
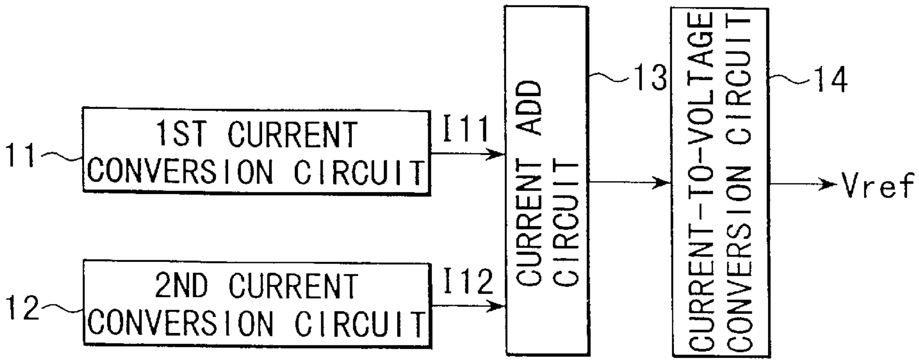
FIG. 3 is a block diagram of the basis configuration of a reference voltage generation circuit according to the present invention.

FIG. 3 shows the basic configuration of a reference voltage generation circuit according to the present invention.

In FIG. 3, numeral 11 indicates a first current conversion circuit for converting a forward voltage at a p-n junction into a first current proportional to the forward voltage, 12 a second current conversion circuit for converting a voltage difference between forward voltages of p-n junctions differing in current density into a second current proportional to the voltage difference, 13 a current add circuit for adding the first current from the first current conversion circuit 11 to the second current from the second current conversion circuit 12 to produce a third current, and 14 a current-to-voltage conversion circuit for converting the third current into a voltage. MIS (Metal-Insulator-Semiconductor) transistors are used as active elements other than the p-n junctions.

As described above, according to the present invention, a reference voltage or current of a given value can be generated with less temperature dependence by converting the forward voltage of the p-n junction of the diode and the difference between forward voltages of p-n junctions differing in current density into currents and then adding the currents. By using MIS transistors to constitute the active elements (other than p-n junctions) as the principal portion of the circuit that performs the current conversion and the subsequent voltage conversion, all of the current conversion circuit, current add circuit, and current-to-voltage conversion circuit can be formed by CMOS manufacturing processes, which prevents a significant increase in the number of processes.

A first implementation of the reference voltage generation circuit of FIG. 3 will be explained.

Figure 4:
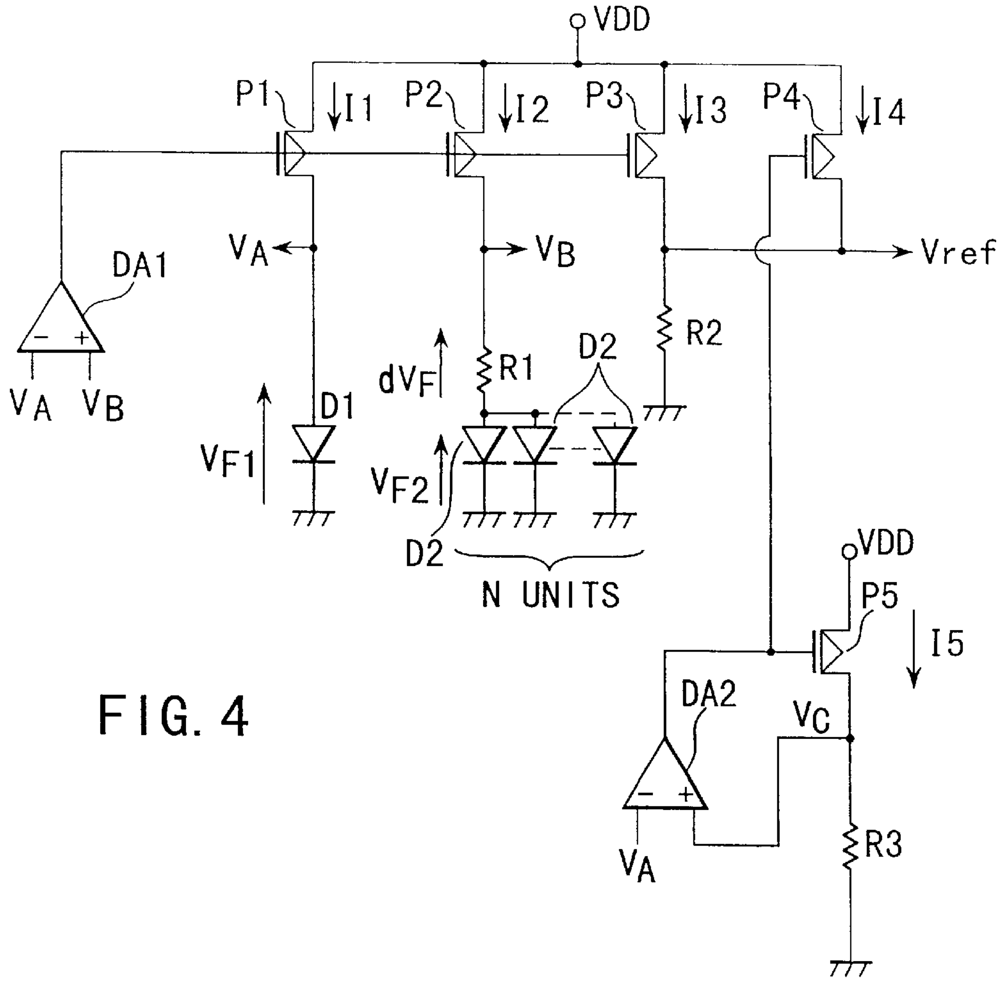
FIG. 4 is a circuit diagram of a first embodiment according to a first implementation of the reference voltage generation circuit in FIG. 3.
Figure 5:
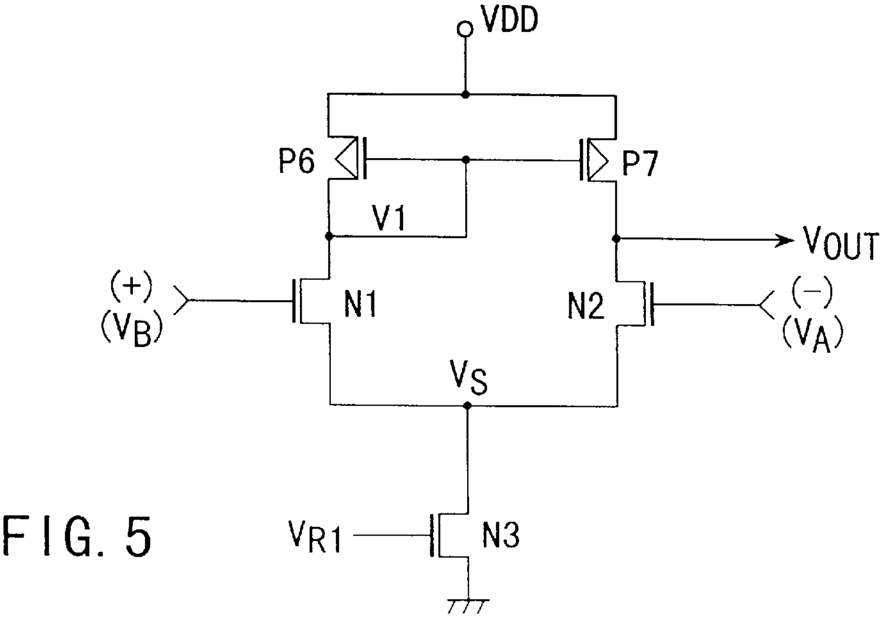
FIG. 5 is a circuit diagram of an example of the differential amplifier circuit in FIG. 4.
Figure 6:
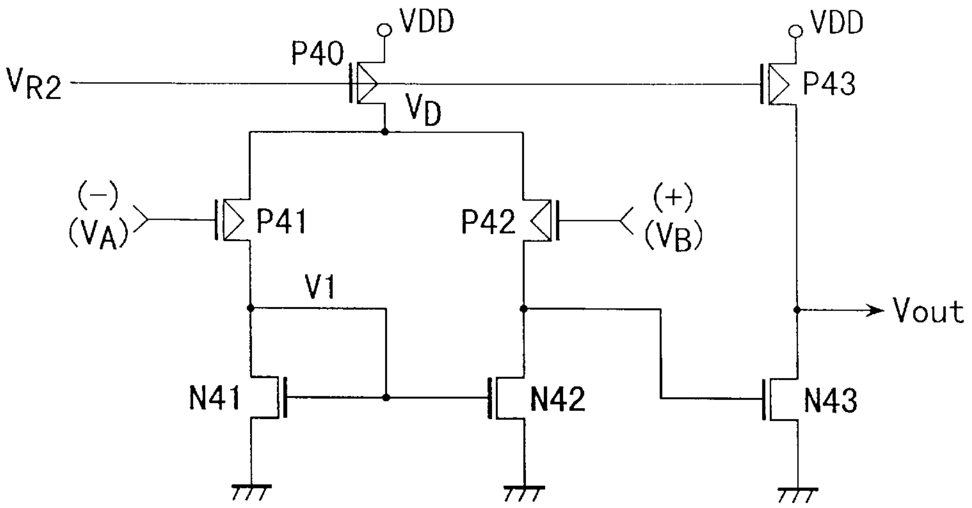
FIG. 6 is a circuit diagram of another example of the differential amplifier circuit in FIG. 4.

First Embodiment (FIGS. 4 to 6)

FIG. 4 shows an embodiment according to a first implementation of the reference voltage generation circuit of FIG. 3.

In FIG. 4, the portion corresponding to the second current conversion circuit 12 of FIG. 3 includes a first PMOS transistor $P_1$ and a first p-n junction (diode) $D_1$ connected in series between a power supply node ($V_{DD}$ node) to which a power supply voltage $V_{DD}$ is supplied and a ground node ($V_{SS}$ node) to which a ground potential $V_{SS}$ is supplied; a second PMOS transistor $P_2$, a first resistance element $R_1$, and a parallel connection of second p-n junctions (diodes) $D_2$ connected in series between the $V_{DD}$ node and $V_{SS}$ node, the source and gate of the first PMOS transistor $P_1$ being connected respectively to the source and gate of the second PMOS transistor $P_2$; a third PMOS transistor $P_3$ whose source is connected to the $V_{DD}$ node and whose gate is connected to the gate of the second PMOS transistor $P_2$; and a feedback control circuit for inputting a first voltage $V_A$ dependent on the characteristics of the first p-n junction $D_1$ and a second voltage $V_B$ dependent on the characteristics of the first resistance element $R_1$ and the second p-n junction $D_2$ to a differential amplifier circuit $DA_1$, and applying the output of the differential amplifier circuit $DA_1$ to the gate of the first PMOS transistor $P_1$ and the gate of the second PMOS transistor $P_2$, thereby performing feedback control such that the first voltage $V_A$ becomes equal to the second voltage $V_B$.

The portion corresponding to the first current conversion circuit 11 of FIG. 3 includes a fourth PMOS transistor $P_4$ whose source is connected to the $V_{DD}$ node; a fifth PMOS transistor $P_5$ and a second resistance element $R_3$ connected in series between the $V_{DD}$ node and $V_{SS}$ node, the source and gate of the fifth PMOS transistor $P_5$ being connected respectively to the source and gate of the fourth PMOS transistor $P_4$; and a control circuit for inputting the first voltage $V_A$ and a voltage $V_C$ at one end of the second resistance element $R_3$ to a differential amplifier circuit $DA_2$, and applying the output of the differential amplifier circuit $DA_2$ to the gate of the fifth PMOS transistor $P_5$, thereby performing feedback control such that the terminal voltage $V_C$ at the second resistance element $R_3$ becomes equal to the first voltage $V_A$.

The portion corresponding to the current add circuit 13 of FIG. 3 is the portion where the drain of the third PMOS transistor $P_3$ is connected to the drain of the fourth PMOS transistor $P_4$.

The portion corresponding to the current-to voltage conversion circuit 14 of FIG. 3 includes a current-to-voltage conversion resistance element $R_2$ connected between the common drain connection node of the third PMOS transistor $P_3$ and fourth PMOS transistor $P_4$ and the $V_{SS}$ node. An output voltage (reference voltage) $V_{ref}$ is produced at one end of the resistance element $R_2$.

In the explanation below, the PMOS transistors $P_1$ to $P_5$ are assumed to have the same size. The drain voltage of the first PMOS transistor $P_1$ is used as the first voltage $V_A$ and the drain voltage of the second PMOS transistor $P_2$ is used as the second voltage $V_B$.

In the reference voltage generation circuit of FIG. 4, $V_{F1}$ and $V_{F2}$ are the forward voltages of diodes $D_1$ and $D_2$, respectively. $I_1$, $I_2$, $I_3$, $I_4$, and $I_5$ are the drain currents in the PMOS transistors $P_1$ to $P_5$, respectively. The voltage across $R_1$ is indicated by $dV_F$.

Feedback control is performed by the differential amplifier circuit $DA_1$ to meet the relation:

$$V_A=V_B \quad (17)$$

Because the PMOS transistors $P_1$ and $P_2$ have the common gate, this gives:

$$I_1=I_2 \quad (18)$$

Since $V_A=V_{F1}$ $$V_B=V_{F2}+dV_F$$

$$dV_F=V_{F1}-V_{F2} \quad (19)$$

$$\text{Thus, } I_1=I_2=dV_F/R_1 \quad (20)$$

On the other hand, feedback control is performed by the differential amplifier circuit $DA_2$ to meet the relation:

$$V_C=V_A \quad (21)$$

$$\text{Thus, } I_5=V_C/R_3=V_A/R_3=V_{F1}/R_3 \quad (22)$$

Because a group of PMOS transistors $P_1$, to $P_3$ and a group of PMOS transistors $P_4$, $P_5$ respectively constitute current mirror circuits, this gives:

$$I_3=I_2 \quad (23)$$

$$I_4=I_5 \quad (24)$$

$$\text{Thus, } V_{ref}=R_2(I_4+I_3)$$

$$=R_2\{(V_{F1}/R_3)+(dV_F/R_1)\}$$

$$=(R_2/R_3)\{V_{F1}+(R_3/R_1)dV_F\} \quad (25)$$

The ratio of $R_3$ to $R_1$ is set so that $V_{ref}$ may not be temperature-dependent. The level of $V_{ref}$ can be set freely by the ratio of $R_2$ to $R_3$ in the range of the power supply voltage $V_{DD}$.

For example, when N=10, $R_1$=60 kΩ, $R_2$=300 kΩ, and $R_3$=600 kΩ, $dV_F$ is the voltage difference between diode $D_1$ and diode $D_2$ whose current ratio is 1:10.

$$\text{Thus, } V_{ref}=(V_{F1}+10\cdot dV_F)/2=0.625\text{V} \quad (26)$$

Figure 1:
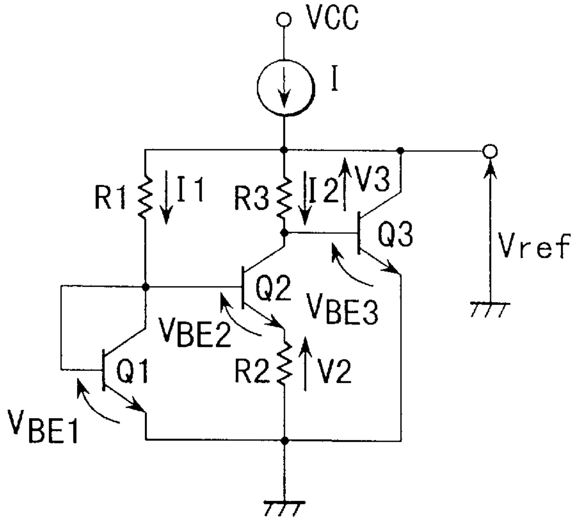
FIG. 1 (PRIOR ART)
FIG. 1 is a circuit diagram of a bandgap reference circuit using conventional bipolar transistors.
Figure 2:
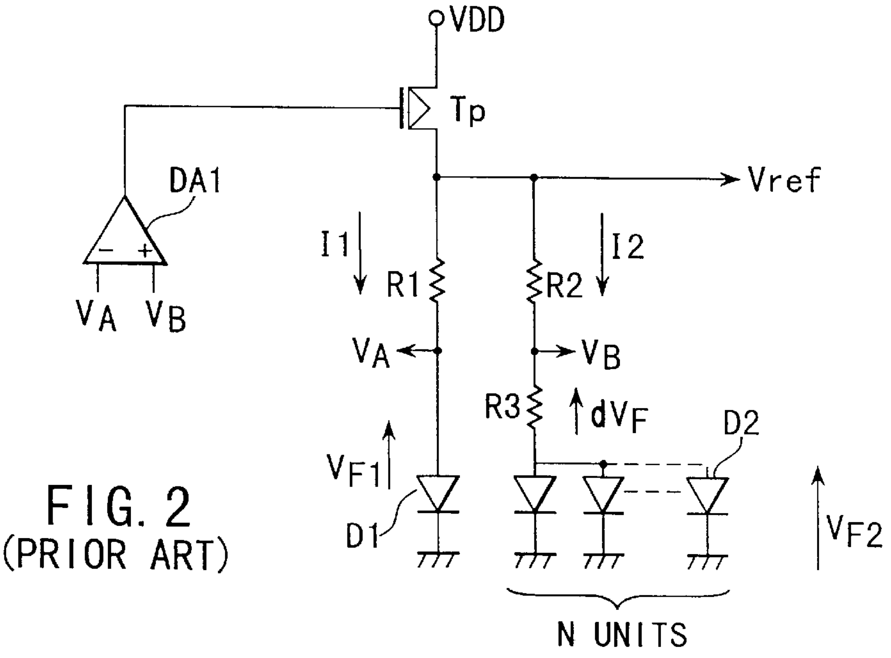
FIG. 2 (PRIOR ART)
FIG. 2 is a circuit diagram of a bandgap reference circuit using conventional CMOS transistors.

The output voltage $V_{ref}$ is half the output voltage $V_{ref}$ (equation (16)) of the BGR circuit in the second conventional example of FIG. 2. Since the output voltage $V_{ref}$ expressed by equation (16) has almost no temperature dependence, the output voltage $V_{ref}$ expressed by equation (26) has almost no temperature dependence either.

Adjustment of the value of the current-to-voltage conversion resistance element $R_2$ makes it possible to generate almost any output voltage in the range of the power supply voltage $V_{DD}$. Especially when the value of $R_2$ is made half the value of $R_3$, the output voltage has a value close to $V_A$, $V_B$, and $V_C$. This makes the drain voltages in the respective transistors almost equal in the current mirror circuit using the PMOS transistors $P_1$ to $P_3$ and the current mirror circuit using the PMOS transistors $P_4$ and $P_5$. As a result, the current mirror circuits can be used in the good characteristic regions.

In the above explanation, to simplify the explanation, it has been assumed that the PMOS transistors have the same size. They need not have the same size. The values of the individual resistances may be set suitably, taking into account the ratio of their sizes.

FIG. 5 shows an NMOS amplifier and a CMOS differential amplifier circuit including a PMOS current mirror load circuit as a first example of the differential amplifier circuits $DA_1$, $DA_2$ of FIG. 4. The differential amplifier circuit causes an NMOS transistor to receive the input voltage and amplifies it.

The differential amplifier circuit of FIG. 5 includes two NMOS transistors $N_1$, $N_2$ whose sources are connected to each other and which form a differential amplification pair, a constant current source NMOS transistor $N_3$ which is connected between the common source connection node of the NMOS transistors forming the differential amplification pair and the ground node and to whose gate a bias voltage $V_{R1}$ is applied, and two PMOS transistors $P_6$, $P_7$ which are connected as a load between the drain of the NMOS transistors forming the differential amplification pair and the $V_{DD}$ node and which provide current mirror connection.

Specifically, the differential amplifier circuit includes a sixth PMOS transistor $P_6$ whose source is connected to $V_{DD}$ node and whose gate and drain are connected to each other, a seventh PMOS transistor $P_7$ whose source is connected to $V_{DD}$ node and whose source and gate are connected respectively to the source and gate of the sixth PMOS transistor $P_6$, a first NMOS transistor $N_1$ whose drain is connected to the drain of the sixth PMOS transistor $P_6$ and to whose gate the voltage $V_B$ is applied, a second NMOS transistor $N_2$ whose drain is connected to the drain of the seventh PMOS transistor $P_7$ and to whose gate the voltage $V_A$ is applied, and a third NMOS transistor $N_3$ for a constant current source which is connected between the common source connection node of the first NMOS transistor $N_1$ and second NMOS transistor $N_2$ and the ground node and to whose gate a bias voltage $V_R$ is applied.

When the differential amplifier circuit of FIG. 5 is used, the threshold value $V_{TN}$ of the NMOS transistor has to be lower than the input voltage $V_{IN}$ to operate the circuit.

The lower limit $V_{DDMIN}$ Of the power supply voltage $V_{DD}$ for the entire circuit will be described.

It is assumed that each transistor in the differential amplifier circuit performs pentode operation and operates near the threshold value with the same input voltage $V_{IN}$ being applied to the +input terminal and −input terminal.

The transistor to whose gate the bias voltage $V_{R1}$ is applied functions as a constant current source and not only decreases the current in the differential amplifier circuit and but also causes the transistors $N_1$, $N_2$ to which the input voltage $V_{IN}$ is supplied to perform pentode operation to increase the amplification factor. As a result, the potential $V_S$ at the common source connection node of the NMOS transistors $N_1$, $N_2$ forming the differential pair rises to $V_{IN}-V_{TN}$ and the drain potential $V_1$ of the NMOS transistor $N_1$ and the drain potential (output voltage) $V_{OUT}$ Of the NMOS transistor $N_2$ are lowered only to $V_S$.

Consequently, if the threshold value of the PMOS transistor is $V_{PT}$ ($V_{TP}$ has a negative value), the PMOS transistor cannot be turned on unless the power supply voltage $V_{DD}$ is equal to or higher than $V_S+|V_{PT}|$. As a result, the differential amplifier circuit will not operate.

Similarly, the PMOS transistor to whose gate the output voltage $V_{OUT}$ of the differential amplifier circuit is applied is not turned on, which prevents the reference voltage generation circuit from operating.

Even if the differential amplifier circuit operates, when the power supply voltage $V_{DD}$ is equal to or lower than the diode voltage $V_{F1}$, the entire circuit (reference voltage generation circuit) will not operate.

When $V_{DDMIN}$ is found by substituting $V_{F1}$ into $V_{IN}$, the operating condition is expressed as $V_{TN}<V_{F1}$.

When $V_{TN}<V_{TP}$, then $V_{DDMIN}=V_{F1}-V_{TN}+|V_{TP}|$.

When $V_{TN}\geqq V_{TP}$, then $V_{DDMIN}=V_{F1}$.

Specifically, the reference voltage generation circuit of FIG. 4 using the differential amplifier circuit of FIG. 5 converts a forward voltage of a diode into a current proportional to the forward voltage and converts a voltage difference between the forward voltages of diodes differing in current density into a current proportional to the voltage difference, adds the two currents, and converts the resulting current into a voltage, which is a reference voltage $V_{ref}$.

In this case, adjusting the threshold of the transistor brings the lower limit $V_{DDMIN}$ Of the power supply voltage close to the $V_F$ (about 0.8V) of the diode. Therefore, the reference voltage generation circuit of the present embodiment can be used in a semiconductor device required to operate on low voltages and is very useful, as compared with the conventional BGR circuit where the lower limit VDDMIN of the power supply voltage could not be made lower than about 1.25V even if the threshold of the transistor was changed.

FIG. 6 shows a second example of the differential amplifier circuits $DA_1$, $DA_2$ of FIG. 4.

The differential amplifier circuit includes a CMOS differential amplifier circuit constituted by a PMOS differential amplifier circuit and an NMON current mirror load circuit and a CMOS inverter for inverting and amplifying the output of the CMOS differential amplifier circuit. It causes the PMOS transistor to receive the input voltage and performs two-stage amplification.

The differential amplifier circuit of FIG. 6 includes two PMOS transistors $P_{41}$, $P_{42}$ whose sources are connected to each other and which form a differential amplification pair, a constant current source PMOS transistor $P_{40}$ which is connected between the power supply node and the common source connection node of the PMOS transistors $P_{41}$, $P_{42}$ forming the differential amplification pair and to whose gate a bias voltage $V_{R2}$ is applied, and two NMOS transistors $N_{41}$, $N_{42}$ which are connected as a load between the drains of the PMON transistors $P_{41}$, $P_{42}$ forming the differential amplification pair and the ground node and which provide current mirror connection.

Specifically, the differential amplifier circuit of FIG. 6 includes a constant current source PMOS transistor $P_{40}$ whose source is connected to $V_{DD}$ node and to whose gate the bias voltage $V_{R2}$ is applied, a PMOS transistor $P_{41}$ whose source is connected to the drain of the PMOS transistor $P_{40}$ and to whose gate the voltage $V_A$ is applied, a PMOS transistor $P_{42}$ whose source is connected to the drain of the PMOS transistor $P_{40}$ and to whose gate the voltage $V_B$ is applied, an NMOS transistor $N_{41}$ whose drain and gate are connected to the drain of the PMOS transistor $P_{41}$ and whose source is connected to $V_{SS}$ node, an NMOS transistor $N_{42}$ whose drain is connected to the drain of the PMOS transistor $P_{42}$ and whose gate and source are connected respectively to the gate and source of the NMOS transistor $N_{41}$, a PMOS transistor $P_{43}$ whose source is connected to $V_{DD}$ node and whose gate is connected to the gate of the PMOS transistor $P_{40}$, and an NMOS transistor $N_{43}$ whose drain is connected to the drain of the PMOS transistor $P_{43}$ and whose gate is connected to the drain of the NMOS transistor $N_{42}$.

The lower limit $V_{DDMIN}$ of the power supply voltage when the differential amplifier circuit of FIG. 6 is used will be described. It is assumed that the same input voltage $V_{IN}$ is applied to the +input terminal and −input terminal of the differential amplifier circuit.

The transistor $P_{40}$ to whose gate the bias voltage $V_{R2}$ is applied function as a constant current source and not only decreases the current in the differential amplifier circuit but also causes the transistors $P_{41}$, $P_{42}$ to which the input voltage $V_{IN}$ is supplied to perform pentode operation to increase the amplification factor.

As a result, the drain potential $V_D$ of the PMOS transistor $P_{41}$ drops to $V_{IN}+|V_{TP}|$. The PMOS transistors $P_{41}$, $P_{42}$ to whose gates $V_{IN}$ is applied cannot be turned on unless the power supply voltage $V_{DD}$ is equal to or higher than $V_{IN}+|V_{TP}|$.

If the potential at the common source connection node of the PMOS transistors $P_{41}$, $P_{42}$ is $V_D$ and the drain potential of the NMOS transistor $N_{41}$ is $V_1$, the NMOS transistors $N_{41}$, $N_{42}$ will not turn on unless $V_1<V_D$ and $V_1<V_{TN}$.

Therefore, the operating conditions are expressed by:

$$V_{F1}+|V_{PT}|>V_{TN}$$

$$V_{DDMIN}=V_{F1}+|V_{TP}|.$$

Hereinafter, a second implementation of the reference voltage generation circuit according to the present invention will be explained.

Figure 7:
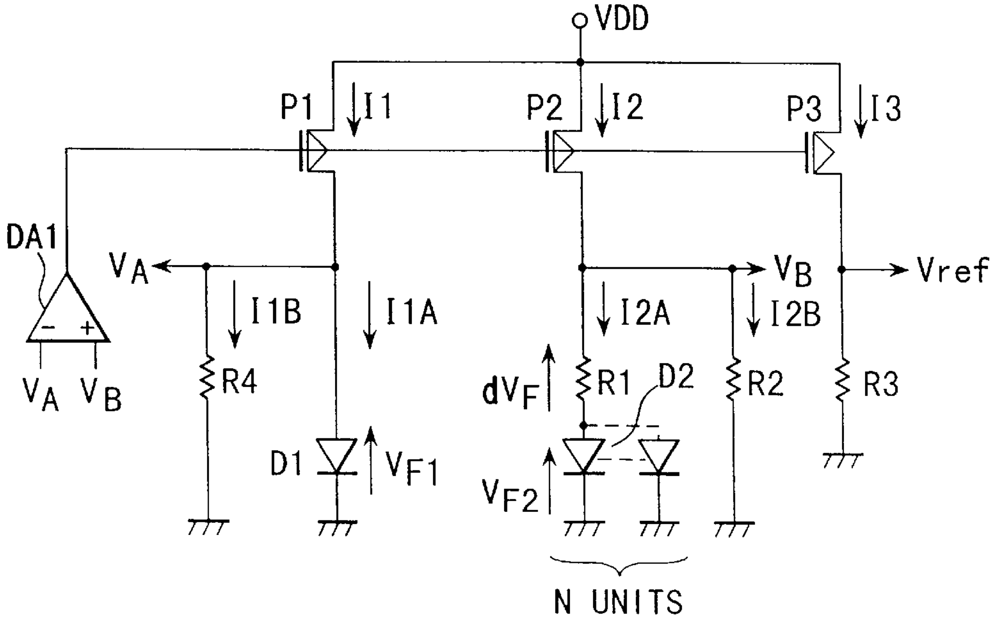
FIG. 7 is a circuit diagram of a second embodiment according to a second implementation of the reference voltage generation circuit in FIG. 3.

Second Embodiment (FIG. 7)

FIG. 7 shows an embodiment according to a second implementation of the reference voltage generation circuit of FIG. 3.

In FIG. 7, the portion corresponding to the second current conversion circuit 12 of FIG. 3 includes a first PMOS transistor $P_1$ and a first p-n junction $D_1$ connected in series between $V_{DD}$ node and $V_{SS}$ node; a second PMOS transistor $P_2$, a first resistance element $R_1$, and a parallel connection of (an N number of) second p-n junctions $D_2$ connected in series between $V_{DD}$ node and $V_{SS}$ node, the source and gate of the first PMOS transistor $P_1$ being connected respectively to the source and gate of the second PMOS transistor $P_2$; a feedback control circuit for inputting a first voltage $V_A$ dependent on the characteristics of the first p-n junction $D_1$ and a second voltage $V_B$ dependent on the characteristics of the second p-n junction $D_2$ to a differential amplifier circuit $DA_1$, and applying the output of the differential amplifier circuit $DA_1$ to the gate of the first PMOS transistor $P_1$ and the gate of the second PMOS transistor $P_2$, thereby performing feedback control such that the first voltage $V_A$ becomes equal to the second voltage $V_B$.

The portion corresponding to the first current conversion circuit 11 of FIG. 3 includes second resistance elements $R_4$, $R_2$, with the element $R_4$ connected in parallel with the first p-n junction $D_1$ and the element $R_2$ connected in parallel with the series circuit of the first resistance element $R_1$ and second p-n junction $D_2$.

The portion corresponding to the current add circuit 13 of FIG. 3 is the portion where the second resistance element $R_2$ is connected to the first resistance element $R_1$.

The portion corresponding to the current-to-voltage conversion circuit 14 of FIG. 3 includes a third PMOS transistor $P_3$ whose source is connected to $V_{DD}$ node and whose gate is connected to the gate of the second PMOS transistor $P_2$; and a current-to-voltage conversion resistance element $R_3$ connected between the drain of the third PMOS transistor $P_3$ and the $V_{SS}$ node.

In the explanation below, the PMOS transistors $P_1$, to $P_3$ are assumed to have the same size. The drain voltage of the first PMOS transistor $P_1$ is used as the first voltage $V_A$ and the drain voltage of the second PMOS transistor $P_2$ is used as the second voltage $V_B$.

$V_A$ and $V_B$ are both inputted to the differential amplifier circuit $DA_1$. The output of the differential amplifier circuit $DA_1$ is supplied to the gates of the PMOS transistors $P_1$ to $P_3$ such that feedback control is performed to meet the relation:

$$V_A=V_B$$

Because the PMOS transistors $P_1$ and $P_3$ have the common gate, this gives:

$$I_1=I_2=I_3$$

If $R_2=R_4$, this will give:

$$I_{1A}=I_{2A}$$

$$I_{1B=2B}$$

$$V_A=V_{F1}$$

$$V_B=V_{F2}+dV_F$$

$$dV_F=V_{F1}-V_{F2}$$

Because the voltage across $R_1$ is $dV_F$, this gives:

$$I_{2A}=dV_F/R_1$$

$$I_{2B}=V_{F1}/R_2$$

Thus, $I_2=I_{2B}+I_{2A}=V_{F1}/R_2+dV_F/R_1$ $$V_{ref}=R_3\cdot I_3=R_3\cdot I_2$$

$$=R_{3\{(VF1}/R_2)+(dV_F/R_1)\}$$

$$=(R_3/R_2)\{V_{F1}+(R_2/R_1)dV_F\}.$$

With the reference voltage generation circuit of FIG. 7, too, the resistance ratio of $R_2$ to $R_1$ can be set so that $V_{ref}$ may not be temperature-dependent. Setting the resistance ratio of $R_2$ to $R_3$ enables the level of $V_{ref}$ to be set at any value in the range of the power supply voltage.

Although the circuit of the second embodiment uses more resistance elements than that of the first embodiment, it has the advantage of using only one feedback loop.

Figure 8:
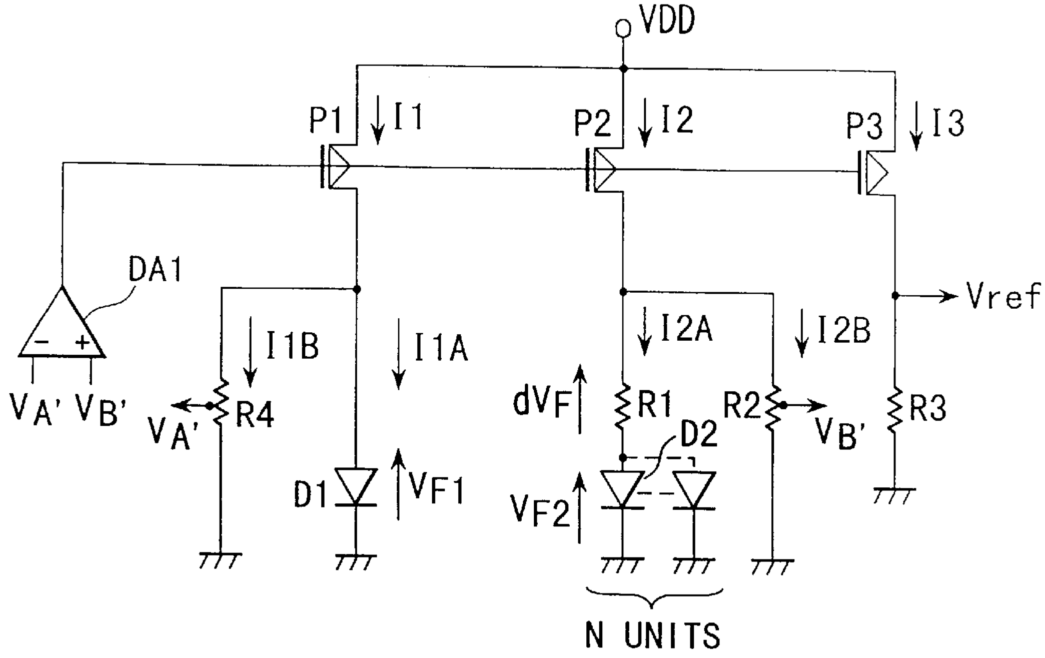
FIG. 8 is a circuit diagram of a modification of the reference voltage generation circuit in FIG. 7.

Third Embodiment (FIG. 8)

FIG. 8 shows a first modification of the reference voltage generation circuit of FIG. 7.

The reference voltage generation circuit of FIG. 8 differs from that of FIG. 7 in that a voltage $V_{A'}$ at an intermediate node on the second resistance element $R_4$ connected in parallel with the first p-n junction $D_1$ is used in place of the first voltage $V_A$ and a voltage $V_{B'}$ at an intermediate node on the second resistance element $R_2$ connected in parallel with the series circuit of the first resistance element $R_1$ and second p-n junction $D_2$ is used in place of the second voltage $V_B$. Since the rest of FIG. 8 is the same as FIG. 7, the same parts are indicated by the same reference symbols.

The operating principle of the reference voltage generation circuit is the same as that of the reference voltage generation circuit of FIG. 7. The inputs $V_{A'}$ and $V_{B'}$ to the differential amplifier circuit $DA_1$ are produced by resistance division of $V_A$ and $V_B$. When $V_{A'=VB'}$, then $V_A=V_B$. In this case, because the input voltage $V_{IN}$ to the differential amplifier circuit $DA_1$ can be made lower than $V_{F1}$, if the lower limit $V_{DDMIN}$ Of the power supply voltage of the entire circuit is determined by the differential amplifier circuit $DA_1$, the $V_{DDMIN}$ can be decreased by the drop in the input voltage $V_{IN}$. When the $V_{A'}$ and $V_{B'}$ are lowered too much, the amplitudes of $V_{A'}$ and $V_{B'}$ decrease considerably as compared with $V_A$ and $V_B$, which increases errors.

Figure 9:
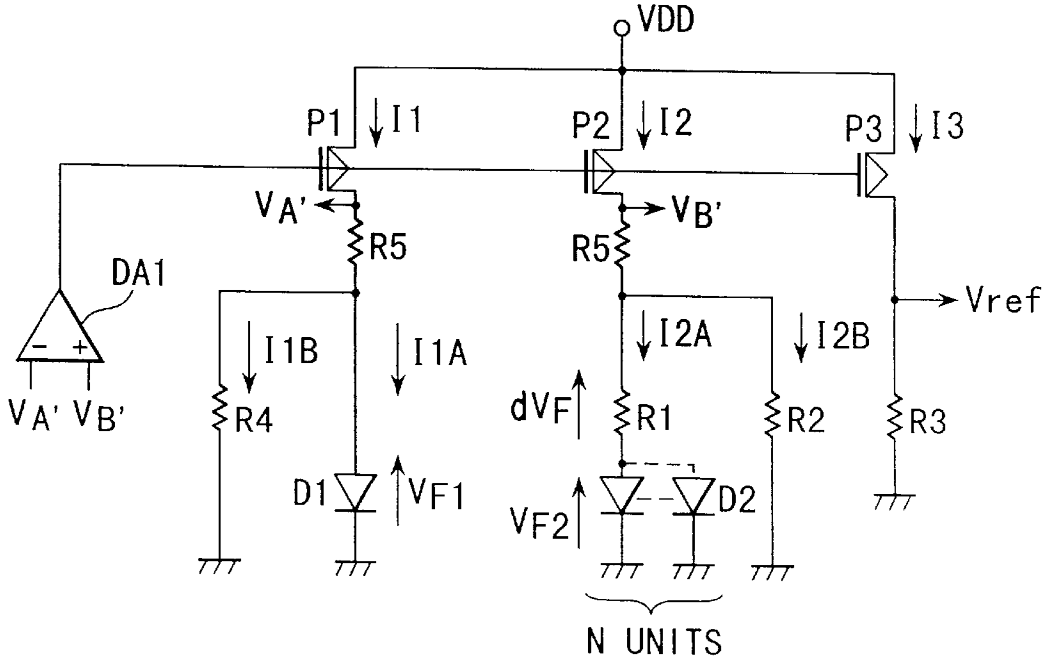
FIG. 9 is a circuit diagram of another modification of the reference voltage generation circuit in FIG. 7.

Fourth Embodiment (FIG. 9)

FIG. 9 shows a second modification of tho reference voltage generation circuit of FIG. 7.

The reference voltage generation circuit of FIG. 9 differs from that of FIG. 7 in that a third resistance element $R_5$ is connected between the drain of the first PMOS transistor $P_1$ and the first p-n junction $D_1$ and another third resistance element $R_5$ is connected between the drain of the second PMOS transistor $P_2$ and the first resistance element $R_1$ and in that the drain voltage $V_{A'}$ of the first PMOS transistor $P_1$ is used in place of the first voltage $V_A$ and the drain voltage $V_{B'}$ of the second PMOS transistor $P_2$ is used in place of the second voltage $V_B$. Since the rest of FIG. 9 is the same as FIG. 7, the same parts are indicated by the same reference symbols.

The operating principle of the reference voltage generation circuit is the same as that of the second embodiment. The inputs $V_{A'}$ and $V_{B'}$ to the differential amplifier circuit $DA_1$, are higher than $V_A$ and $V_B$. When $V_{A'}=V_{B'}$, then $V_A=V_B$. In this case, because the input voltage to the differential amplifier circuit $DA_1$ can be made higher than $V_{F1}$, even if $V_{TN}>V_{F1}$, the differential amplifier circuit of FIG. 5 can be used, which enables $V_{DDMIN}$ to be lowered.

Fifth to Ninth Embodiments (FIGS. 10 to 14)

FIGS. 10 to 14 show concrete examples of using a voltage in the reference voltage generation circuit as the gate bias voltage $V_{R1}$ or $VR_2$ of the constant current source transistor of the differential amplifier circuit in the reference voltage generation circuit of FIG. 7.

Figure 10:
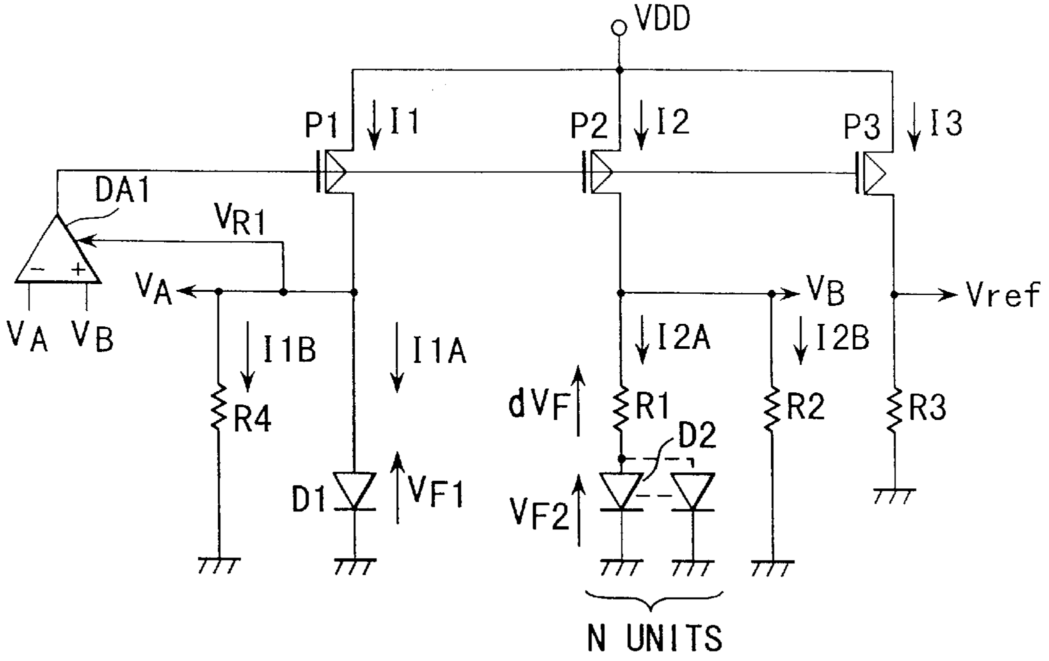
FIG. 10 is a circuit diagram of a first concrete example of using the voltage in the reference voltage generation circuit as the gate bias voltage for the constant current source transistor of the differential amplifier circuit in the reference voltage generation circuit of FIG. 7.

The reference voltage generation circuit (of a fifth embodiment) shown in FIG. 10 is applied to the case where the differential amplifier circuit explained in FIG. 5 is used as the differential amplifier circuit $DA_1$ in the reference voltage generation circuit of FIG. 7. The circuit of FIG. 10 differs from that of FIG. 7 in that the first voltage $V_A$ is applied as the bias voltage $V_{R1}$. Since the rest of FIG. 10 is the same as FIG. 7, the same parts are indicated by the same reference symbols.

Figure 11:
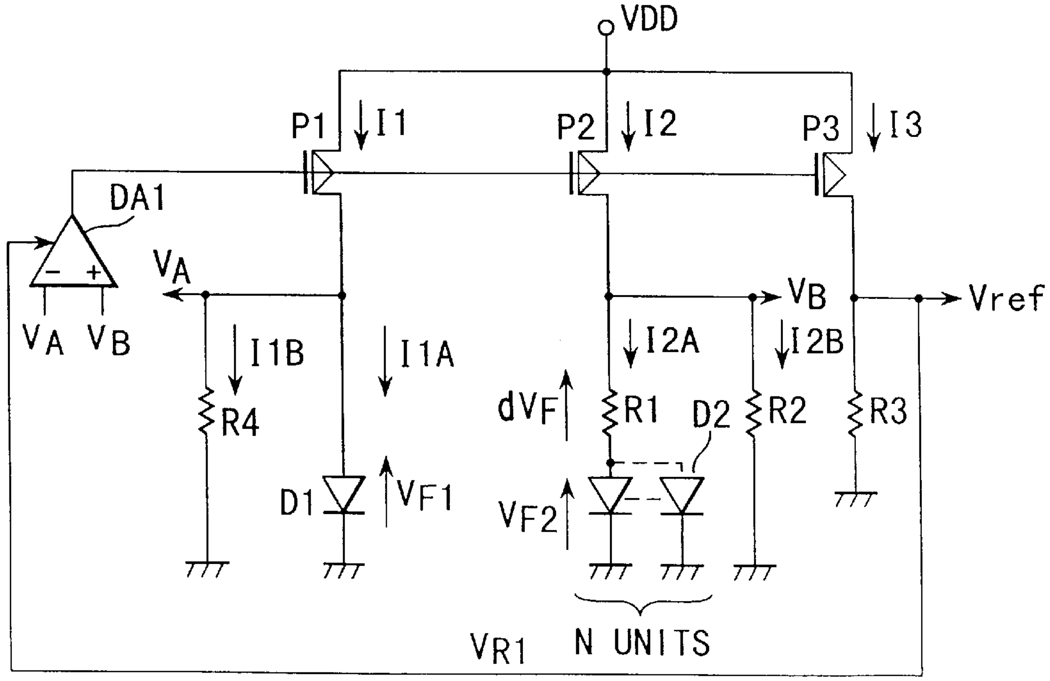
FIG. 11 is a circuit diagram of a second concrete example of using the voltage in the reference voltage generation circuit as the gate bias voltage for the constant current source transistor of the differential amplifier circuit in the reference voltage generation circuit of FIG. 7.

The reference voltage generation circuit (of a sixth embodiment) shown in FIG. 11 is applied to the case where the differential amplifier circuit explained in FIG. 5 is used as the differential amplifier circuit $DA_1$ in the reference voltage generation circuit of FIG. 7. The circuit of FIG. 11 differs from that of FIG. 7 in that the output voltage $V_{ref}$ in the current-to-voltage conversion circuit is applied as the bias voltage $V_{R1}$. Since the rest of FIG. 11 is the same as FIG. 7, the same parts are indicated by the same reference symbols.

Figure 12:
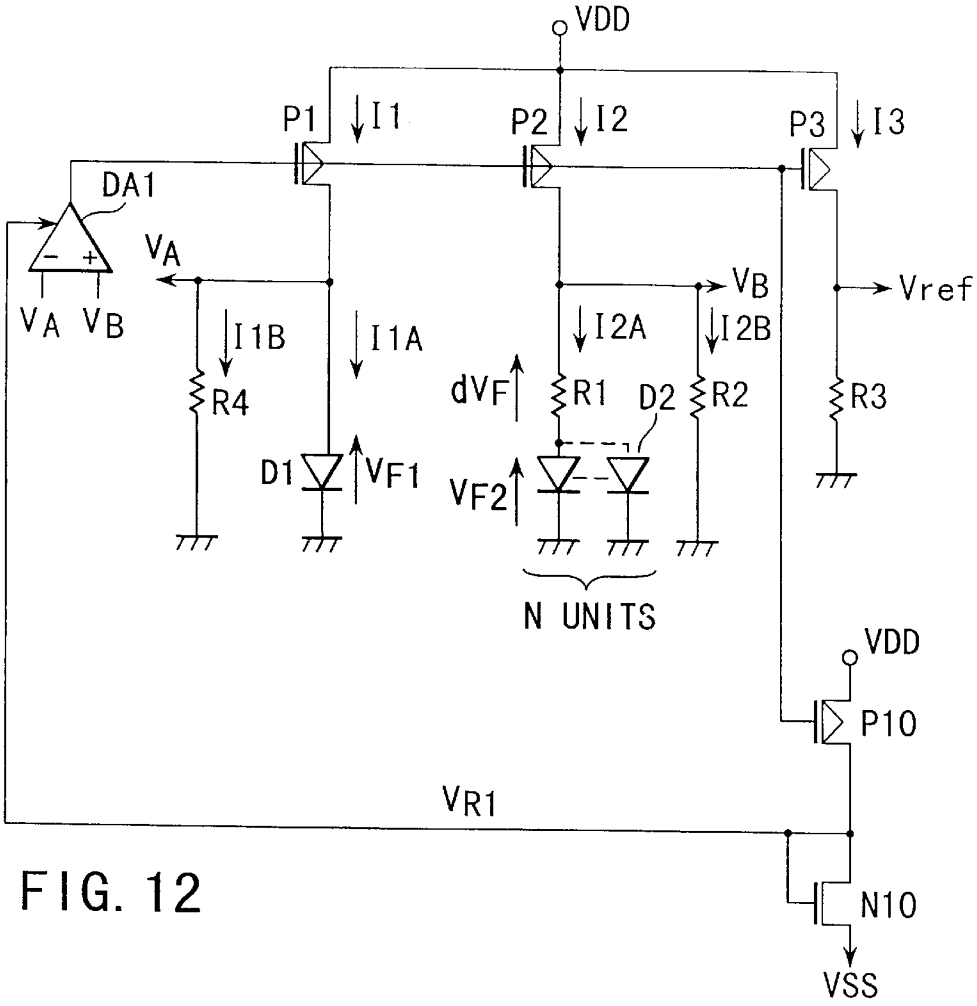
FIG. 12 is a circuit diagram of a third concrete example of using the voltage in the reference voltage generation circuit as the gate bias voltage for the constant current source transistor of the differential amplifier circuit in the reference voltage generation circuit of FIG. 7.

The reference voltage generation circuit (of a seventh embodiment) shown in FIG. 12 is applied to the case where the differential amplifier circuit explained in FIG. 5 is used as the differential amplifier circuit $DA_1$, in the reference voltage generation circuit of FIG. 7. The circuit of FIG. 12 differs from that of FIG. 7 in that a bias circuit for generating the bias voltage $VR_1$ is added. Since the rest of FIG. 12 is the same as FIG. 7, the same parts are indicated by the same reference symbols.

The bias circuit includes a PMOS transistor $P_{10}$ whose source is connected to $V_{DD}$ node and to whose gate the output voltage of the differential amplifier circuit $DA_1$ is applied and an NMOS transistor $N_{10}$which is connected between the drain of the PMOS transistor $P_{10}$ and the $V_{SS}$ node and whose drain and gate are connected to each other. The drain voltage of the PMOS transistor $P_{10}$ is the bias voltage $V_{R1}$.

Figure 13:
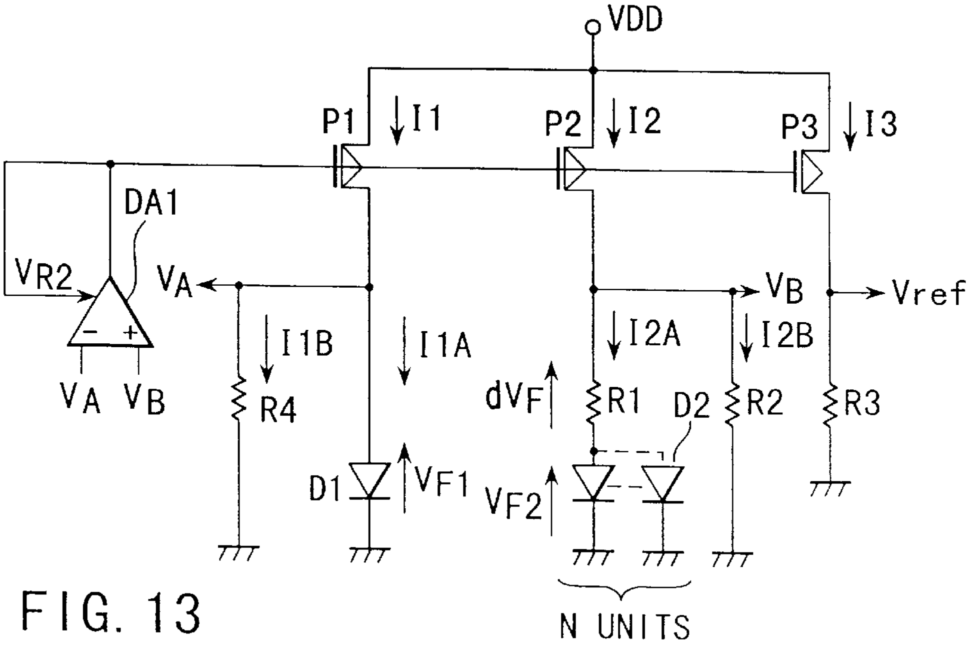
FIG. 13 is a circuit diagram of a fourth concrete example of using the voltage in the reference voltage generation circuit as the gate bias voltage for the constant current source transistor of the differential amplifier circuit in the reference voltage generation circuit of FIG. 7.

The reference voltage generation circuit (of an eighth embodiment) shown in FIG. 13 is applied to the case where the differential amplifier circuit explained in FIG. 6 is used as the differential amplifier circuit $DA_1$ in the reference voltage generation circuit of FIG. 7. The circuit of FIG. 13 differs from that of FIG. 7 in that the output voltage of the differential amplifier circuit $DA_1$ is applied as the bias voltage $VR_2$. Since the rest of FIG. 13 is the same as FIG. 7, the same parts are indicated by the same reference symbols.

Figure 14:
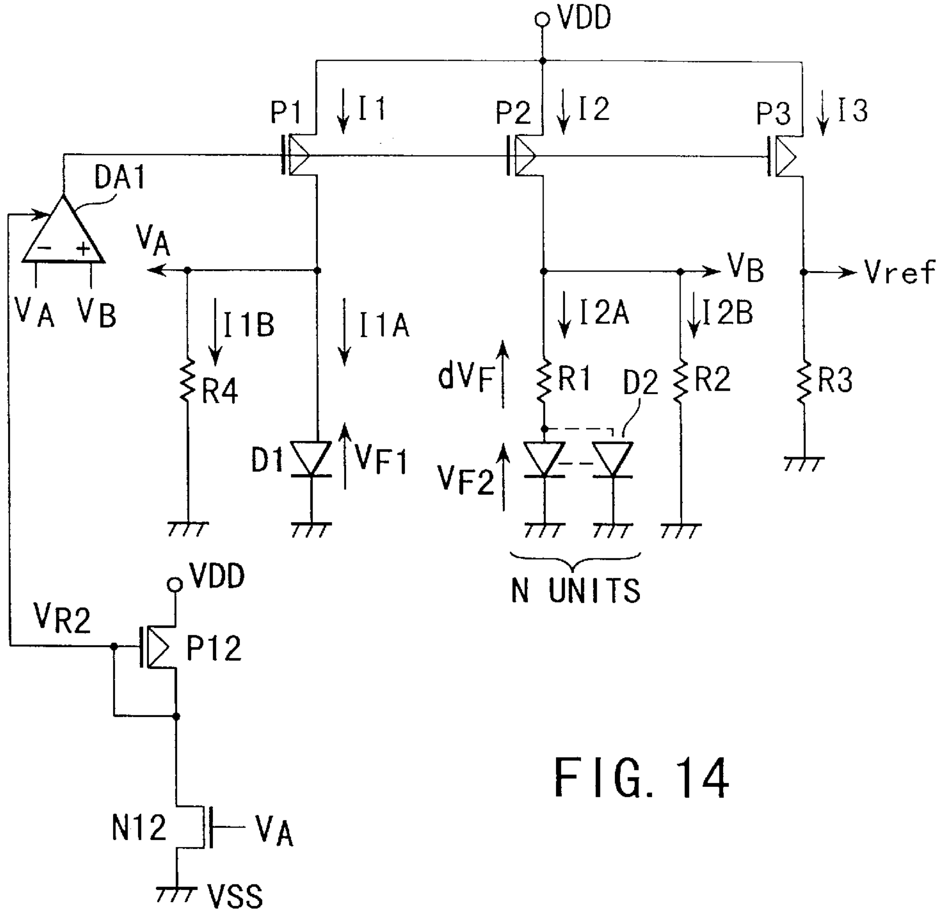
FIG. 14 is a circuit diagram of a fifth concrete example of using the voltage in the reference voltage generation circuit as the gate bias voltage for the constant current source transistor of the differential amplifier circuit in the reference voltage generation circuit of FIG. 7.

The reference voltage generation circuit (of a ninth embodiment) shown in FIG. 14 is applied to the case where the differential amplifier circuit explained in FIG. 6 is used as the differential amplifier circuit $DA_1$ in the reference voltage generation circuit of FIG. 7. The circuit of FIG. 14 differs from that of FIG. 7 in that a bias circuit for generating the bias voltage $V_{R2}$ is added. Since the rest of FIG. 14 is the same as FIG. 7, the same parts are indicated by the same reference symbols.

The bias circuit includes a PMOS transistor $P_{12}$ whose source is connected to $V_{DD}$ node and whose gate and drain are connected to each other and an NMOS transistor $N_{12}$ which is connected between the drain of the PMOS transistor $P_{12}$ and the $V_{SS}$ node and whose gate the first voltage $V_A$ is applied. The drain voltage of the PMOS transistor $P_{12}$ is the bias voltage $VR_2$.

As shown in FIGS. 10 to 14, the reference voltage generation circuit using its internal voltage as the bias voltage for the differential amplifier circuit $DA_1$, makes the drawn current constant, regardless of the power supply voltage $V_{DD}$.

Next, a third implementation of a reference voltage generation circuit according to the present invention will be explained.

Figure 15:
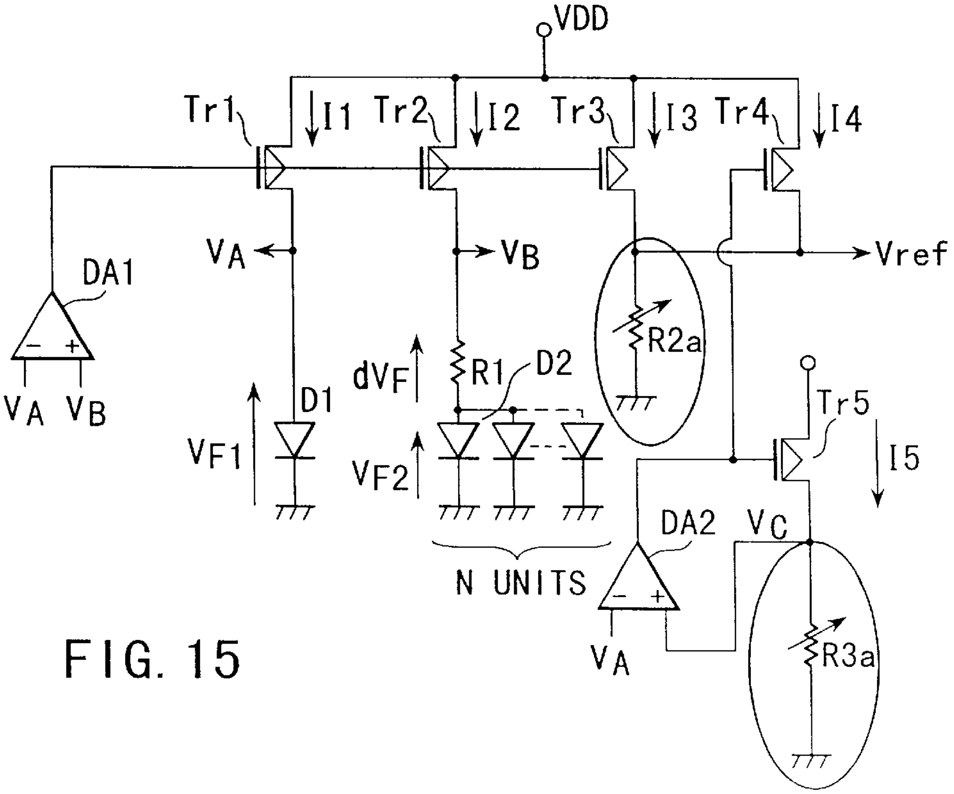
FIG. 15 is a circuit diagram of a third embodiment according to a third implementation of the reference voltage generation circuit in FIG. 3.
Figure 16A:
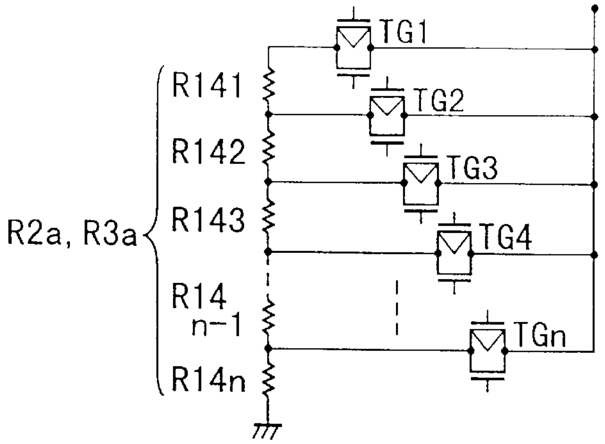
FIGS. 16A and 16B are circuit diagrams of examples of the structure of a resistance element capable of generating voltage levels in FIG. 15.
Figure 16B:
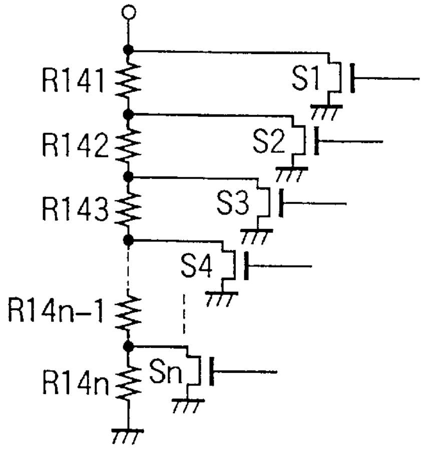
Figure 17:
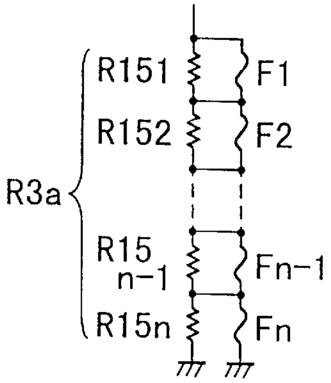
FIG. 17 is a circuit diagram of an example of a second resistance element capable of trimming.

Tenth embodiment (FIGS. 15 to 17)

The reference voltage generation circuit according to a third implementation of the present invention differs from that of the first implementation explained in FIG. 4 in that a current-to-voltage conversion resistance element $R_{2a}$ and a second resistance element $R_{3a}$ are designed to produce more than one voltage level for $V_{ref}$ and $V_C$ as shown in FIG. 15. In FIG. 15, the same parts as those in FIG. 4 are indicated by the same reference symbols.

The reference voltage generation circuit of FIG. 15 can change and adjust the temperature characteristic or output voltage or selectively produces more than one level by changing the resistance values or resistance ratio.

FIG. 16A shows an example of the structure of the encircled portion of the current-to-voltage resistance element $R_{2a}$ or second resistance element $R_{3a}$ capable of generating more than one voltage level. Specifically, there are provided switching elements for selectively connecting the node at one end of a series connection of resistance elements $R_{141}$ to $R_{14n}$ or at least one voltage division node to the output terminal of the reference voltage $V_{ref}$. In this case, CMOS transfer gates TG1 to TGn are used as the switching elements. PMOS transistors and NMOS transistors are connected in parallel to the transfer gates TG1 to TGn, which are driven by complementary signals. Note that the resistance element $R_1$ shown in FIG. 15 may have the same structure as the resistance elements $R_{2a}$ and $R_{3a}$.

In addition, the circuit configuration having switching elements S1 to Sn shown in FIG. 16B may be adopted in place of the circuit configuration of FIG. 16A.

When the second resistance element $R_{3a}$ is designed to enable trimming, it can produce variable resistance values. FIG. 17 shows an example of the structure of the second resistance element $R_{3a}$ capable of trimming. Specifically, for example, polysilicon fuses F1 to Fn blowable by radiation of laser light are formed respectively in parallel with resistance elements $R_{151}$ to $R_{15n}$ connected in series.

Hereinafter, a fourth implementation of a reference voltage generation circuit according to the present invention will be explained.

Figure 18:
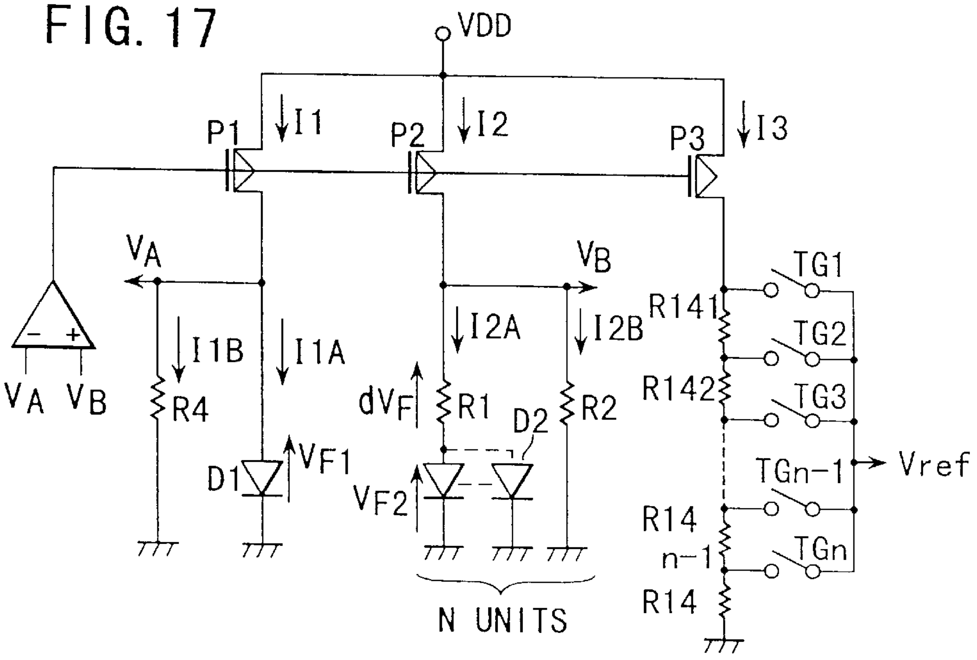
FIG. 18 is a circuit diagram of a fourth implementation of the reference voltage generation circuit in FIG. 3.

Eleventh embodiment (FIG. 18)

FIG. 18 shows an example of a reference voltage generation circuit according to a fourth implementation of the present invention.

The reference voltage generation circuit of FIG. 18 differs from each of those in the second to ninth embodiments explained by reference to FIGS. 7 to 14 in that a series connection of resistance elements $R_{141}$ to $R_{14n}$ is used as a current-to-voltage resistance element and switching elements TG1 to TGn are connected between the node of each resistance element and the output terminal of the reference voltage $V_{ref}$. In FIG. 18, the same parts as those in FIG. 7 are indicated by the same reference symbols. Specifically, in the reference voltage generation circuit of FIG. 18, switching elements are connected to selectively take the current-to-voltage conversion output voltage out of the node at one end of a series of resistance elements $R_{141}$ to $R_{14n}$ or at least one voltage division node. The switching elements may be constituted by, for example, CMOS transfer gates as in the third implementation.

Next, a fifth implementation of a reference voltage generation circuit according to the present invention will be explained.

Figure 19:
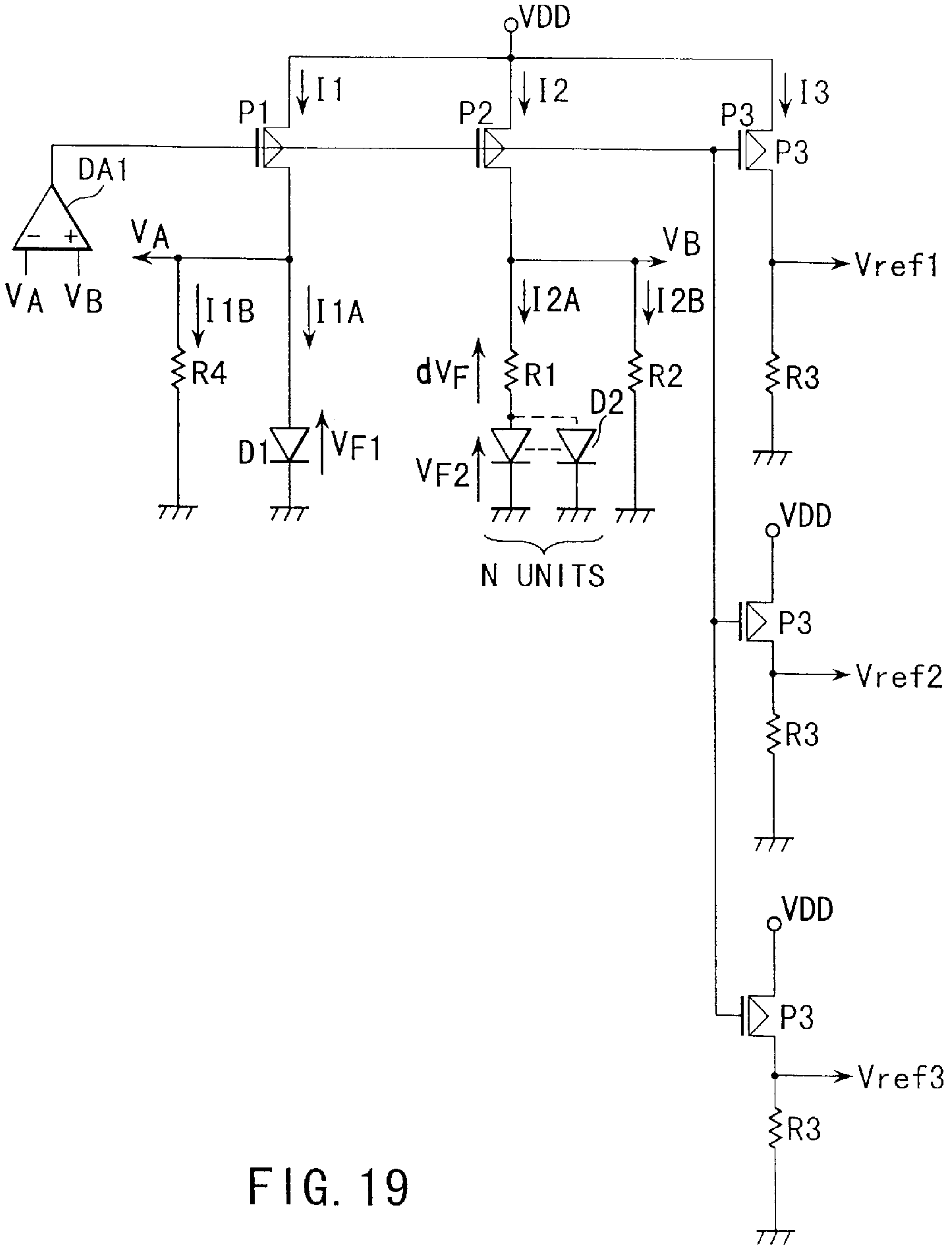
FIG. 19 is a circuit diagram of a fifth implementation of the reference voltage generation circuit in FIG. 3.

Twelfth Embodiment (FIG. 19)

The reference voltage generation circuit according to the fifth implementation of FIG. 19 differs from that of the second implementation explained by reference to FIGS. 7 to 14 in that more than one current-to-voltage conversion circuit (for example, three units of the circuit) are provided and a load for each current-to-voltage conversion circuit is isolated from another load. In FIG. 19, the same parts as those in FIG. 7 are indicted by the same reference symbols.

This configuration has the advantage that disturbance noise in the load in each current-to-voltage conversion circuit is isolated from another noise and that the load driving level of each current-to-voltage conversion circuit can be set arbitrarily such that, for example, the load driving levels differ from each other.

Hereinafter, a sixth implementation of a reference voltage generation circuit according to the present invention will be explained.

Figure 20:
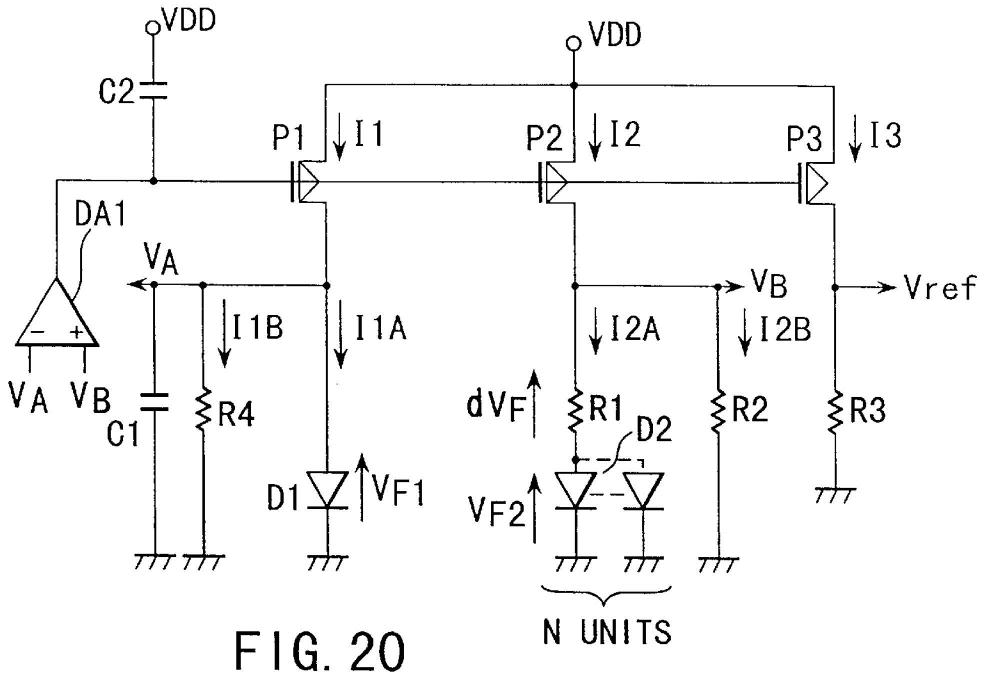
FIG. 20 is a circuit diagram of a sixth implementation of the reference voltage generation circuit in FIG. 3.

Thirteenth Embodiment (FIG. 20)

The reference voltage generation circuit according to the sixth implementation of FIG. 20 differs from that of the second implementation explained by reference to FIGS. 7 to 14 in that, to prevent oscillation of the feedback control circuit (differential amplifier circuit $DA_1$), capacitor C1 is connected between the takeout node of the first voltage $V_A$ and the ground node and capacitor C2 is connected between the output node of the differential amplifier circuit $DA_1$ and the $V_{DD}$ node. In FIG. 20, the same parts as those in FIG. 7 are indicated by the same reference symbols. A similar capacitor may, of course, be provided in the reference voltage generation circuit of the first implementation.

Hereinafter, a seventh implementation of a reference voltage generation circuit according to the present invention will be explained.

Figure 21:
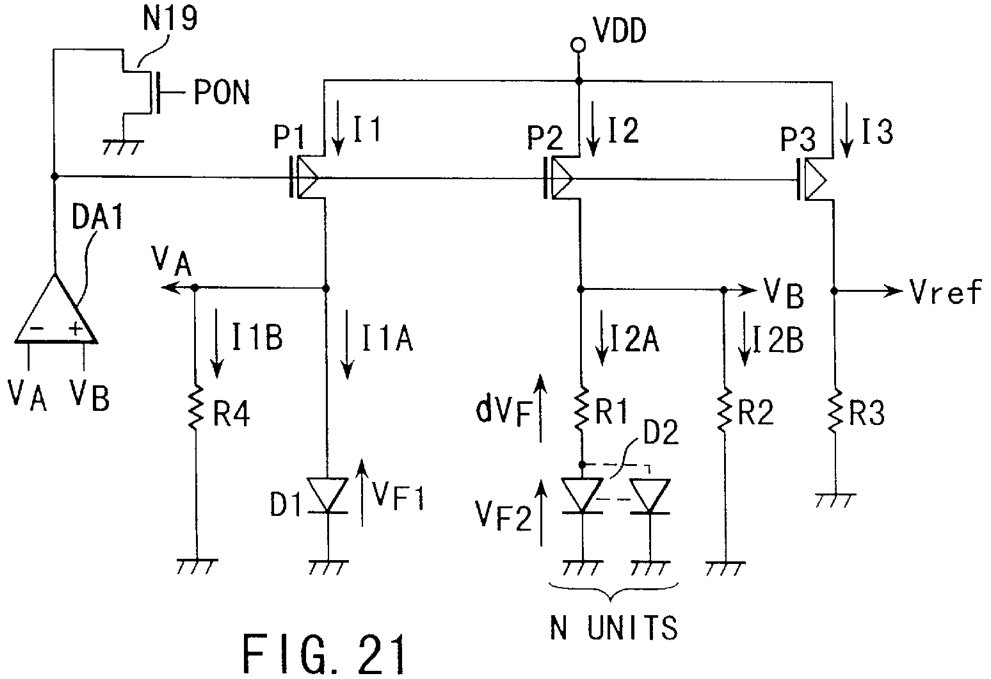
FIG. 21 is a circuit diagram of a seventh implementation of the reference voltage generation circuit in FIG. 3.

Fourteenth Embodiment (FIG. 21)

The reference voltage generation circuit according to the seventh implementation of FIG. 21 differs from that of the second implementation explained by reference to FIGS. 7 to 14 in that a start-up NMOS transistor $N_{19}$ for temporarily resetting the output node to the ground potential when the power supply is turned on is connected between the output node of the differential amplifier circuit $DA_1$ and the ground node and a power on reset signal PON generated at the turning on of the power supply is applied to the gate of the NMOS transistor $N_{19}$. In FIG. 21, the same parts as those in FIG. 7 are indicated by the same reference symbols.

Even when $V_A$, $V_B$ are at 0V, they serve as stable points of the feedback system. Use of the start-up NMOS transistor $N_{19}$ prevents $V_A$, $V_B$ from becoming the stable points at 0V. A similar NMOS transistor may, of course, be provided in the reference voltage generation circuit of the first implementation.

While in the embodiments, the present invention has been applied to the reference voltage generation circuit, it may be applied to a reference current generation circuit, provided the current-to-voltage conversion circuit is eliminated.

For example, when a reference current generation circuit obtained by removing the current-to-voltage conversion resistance $R_2$ in FIG. 4 or a reference current generation circuit obtained by removing the current-to-voltage conversion resistance $R_3$ in FIG. 7 is used, the current output is produced at the drain of the PMOS transistor $P_3$.

Figure 22:
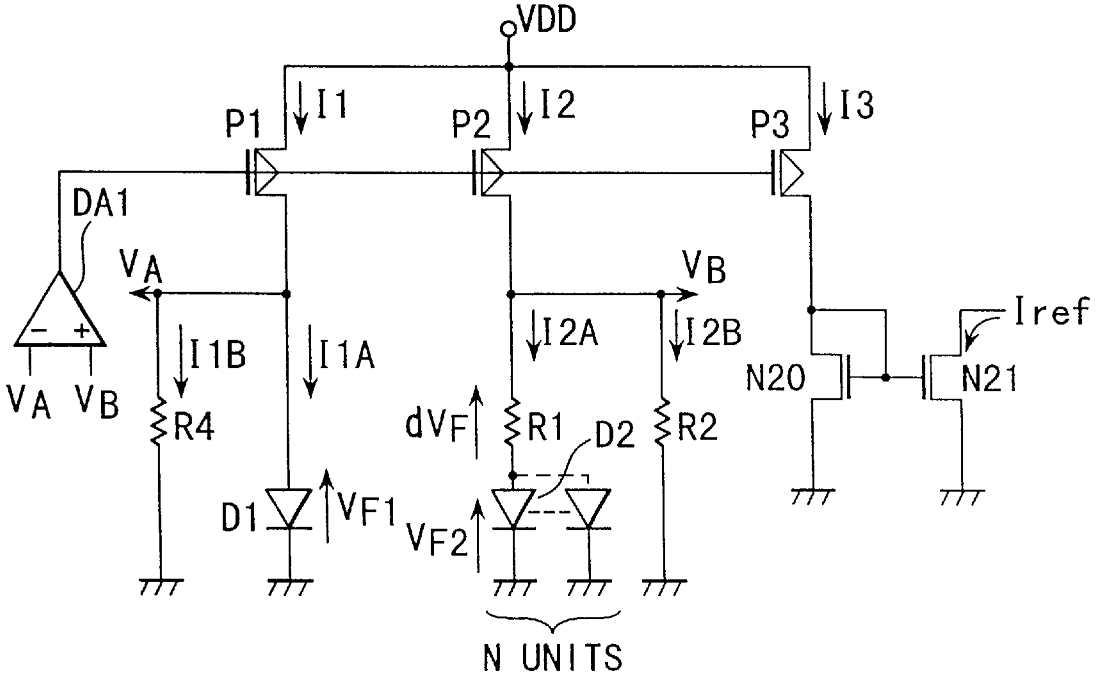
FIG. 22 is a circuit diagram of a reference voltage generation circuit according to the present invention.

Furthermore, for example, as shown in FIG. 22, in the reference current generation circuit without the current-to-voltage conversion resistance $R_3$ in FIG. 7, a reference current Iref may be obtained from the drain of the PMOS transistor $P_3$ via a current mirror circuit CM. The current mirror circuit CM is constituted by an NMOS transistor $N_{20}$ whose drain and source are connected respectively to the drain of the PMOS transistor $P_3$ and the $V_{SS}$ node and whose drain and gate are connected to each other and an NMOS transistor N21 connected to the NMOS transistor so at to form a current mirror circuit. With such a reference current generation circuit, a reference current Iref in the opposite direction to that of the output current directly drawn from the drain of the PMOS transistor can be obtained.

As described above, according to the present invention, a reference voltage or current of a given value can be generated with less temperature dependence by converting the forward voltage of the p-n junction of the diode and the difference between forward voltages of p-n junctions into currents and then adding the currents. By using MIS transistors to constitute the active elements (other than p-n junctions) as the principal portion of the circuit that performs the current conversion and the subsequent voltage conversion, all of the current conversion circuit, current add circuit, and current-to-voltage conversion circuit can be formed by CMOS manufacturing processes, which prevents a significant increase in the number of processes.

As describe in detail, with the reference voltage generation circuit of the present invention, the output voltage with less temperature dependence and less voltage dependence can be set at a given value in the range of the power supply voltage. Furthermore, adjusting the threshold value of the transistor brings the lower limit $V_{DDMIN}$ of the power supply voltage closer to the forward voltage $V_F$ of the diode.

Moreover, the reference current generation circuit of the present invention can generate a reference current with less temperature dependence and less voltage dependence.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of generating a reference voltage, comprising the steps of:

generating a first current which is converted from a first forward voltage of a first constant voltage generating element;

generating a second current which is converted from a voltage difference between forward voltages of the first constant voltage generating element and a second constant voltage generating element including at least a diode-connected element;

adding the first current to the second current to obtain a third current; and converting the third current into a voltage.

2. The method according to claim 1, further comprising a step of changing a level of the voltage obtained in the converting step to output the reference voltage.

3. The method according to claim 1, further comprising a step of generating from the voltage obtained in the converting step, a plurality of voltages differing in level to output a plurality of reference voltages.

4. The method according to claim 1, further comprising a step of suppressing oscillation generated in circuitry for generating the reference voltage.

5. A method of generating a reference voltage, comprising the steps of:

performing feedback control such that a first voltage becomes substantially equal to a second voltage, the first voltage depending on a characteristic of a first p-n junction and the second voltage depending on a characteristic of a second p-n junction including at least a diode-connected element;

adding a first current according to a forward voltage of said first p-n junction to a second current according to a voltage difference between the forward voltage of said first p-n junction and a forward voltage of said second p-n junction to obtain a third current; and converting the third current into a voltage.

6. The method according to claim 5, wherein the feedback control is performed using a differential amplifier and a bias voltage for the differential amplifier is derived using a voltage at an internal node of circuitry for generating the reference voltage.

7. The method according to claim 5, further comprising a step of changing a level of the voltage obtained in the converting step to output the reference voltage.

8. The method according to claim 5, further comprising a step of generating from the voltage obtained in the converting step, a plurality of voltages differing in level to output a plurality of reference voltages.

9. The method according to claim 5, further comprising a step of suppressing oscillation generated in circuitry for generating the reference voltage.

10. A method of generating a reference current, comprising the steps of:

performing feedback control such that a first voltage becomes substantially equal to a second voltage, the first voltage depending on a characteristic of a first p-n junction and the second voltage depending on a characteristic of a second p-n junction including at least a diode-connected element; and adding a first current according to a forward voltage of said first p-n junction to a second current according to the voltage difference between the forward voltage of said first p-n junction and a forward voltage of said second p-n junction.

11. The method according to claim 10, wherein the feedback control is performed using a differential amplifier and a bias voltage for the differential amplifier is derived using a voltage at an internal node of circuitry for generating the reference current.

12. The method according to claim 10, further comprising a step of suppressing oscillation generated in circuitry for generating the reference current.

* * * * *